(12) United States Patent
Makino

(10) Patent No.: US 6,534,738 B2
(45) Date of Patent: Mar. 18, 2003

(54) VACUUM SWITCH CONTAINER, VACUUM SWITCH, METHOD FOR PRODUCING VACUUM SWITCH CONTAINER AND METHOD FOR PRODUCING VACUUM SWITCH

(75) Inventor: Yusuke Makino, Kasugai (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 0 days.

(21) Appl. No.: 09/984,877

(22) Filed: Oct. 31, 2001

(65) Prior Publication Data

US 2002/0108931 A1 Aug. 15, 2002

(30) Foreign Application Priority Data

Oct. 31, 2000  (JP) ........................................ 2000-333119

(51) Int. Cl.[7] .............................................. H01H 33/66
(52) U.S. Cl. ....................................................... 218/118
(58) Field of Search .......................... 218/118, 123–128; 264/61, 63

(56) References Cited

U.S. PATENT DOCUMENTS

| | | | |
|---|---|---|---|
| 4,009,238 A | * | 2/1977 | Niedermeier et al. ....... 264/293 |
| 4,746,834 A | * | 5/1988 | Bauerle et al. ............. 313/137 |
| 5,800,756 A | | 9/1998 | Anderson et al. |
| 6,303,210 B1 | * | 10/2001 | Watanabe et al. ........... 427/384 |
| 6,346,683 B1 | * | 2/2002 | Okutomi et al. ............ 218/123 |

FOREIGN PATENT DOCUMENTS

| | | |
|---|---|---|
| EP | 0 286 335 A1 | 10/1988 |
| EP | 0 838 329 A1 | 4/1998 |

\* cited by examiner

*Primary Examiner*—Elvin Enad
*Assistant Examiner*—M. Fishman
(74) *Attorney, Agent, or Firm*—Larson & Taylor, PLC

(57) ABSTRACT

A vacuum switch container, a vacuum switch, a method of producing the vacuum switch container and a method of producing the vacuum switch are provided. Ceramic granulated powers are used to fill a space of a cylindrical shape defined by an outer hard metal mold having an inner diameter of 120 mm and a center hard metal pin having an outer diameter of 108 mm. A pressure of 1000 kg/cm$^2$ is applied in an axis direction relative to the cylindrical shape by using lower and upper cylindrical punches, from both the top and bottom of the space, to produce a green compact. Next, the green compact is fired in open air at 1600° C. to produce a cylindrical ceramic fired body. Each of the end surfaces of the ceramic fired body are then ground and the ground surface is metalized. Ni plating is applied to the metalized surface, thereby forming an electroconductive layer thereon to complete the vacuum switch container.

6 Claims, 4 Drawing Sheets

VACUUM SWITCH CONTAINER, VACUUM SWITCH, METHOD FOR PRODUCING VACUUM SWITCH CONTAINER AND METHOD FOR PRODUCING VACUUM SWITCH

BACKGROUND OF THE INVENTION

1. Field of the Invention

The present invention relates to a vacuum switch container, a vacuum switch, a method of producing the vacuum switch container and a method of producing the vacuum switch.

2. Description of the Related Art

Heretofore, for example, in producing a vacuum switch container made of ceramics and having a cylindrical shape for use in a vacuum switch, a well-known rubber-press method has been employed.

In this rubber-press method, as is illustrated in FIG. 5, ceramic powders are first provided in a cylindrical space defined between a center pin made of a metal in a columnar shape, i.e., a metal column, and a rubber mold made of rubber in a cylindrical shape, and then an upper cap and a bottom are provided such that the cylindrical space is closed. Next, the ceramic powders are pressed from around the rubber mold to form a green compact. Thereafter, the green compact, after being cut to an appropriate shape, is fired to produce a ceramic sintered body which forms the vacuum switch container.

One disadvantage of the above-described rubber-press method is that the cutting is necessary after the above-mentioned green compact is formed so as to produce the desired dimensional accuracy, thus adding to the operational steps required. Further, because the green compact must be subjected to such cutting, an attendant problem results, i.e., a significant amount of the ceramic material is necessarily wasted as a consequence.

SUMMARY OF THE INVENTION

An object of the present invention is to solve the above-described problems, and to provide a vacuum switch container, a vacuum switch, a method of producing the vacuum switch container and a method of producing the vacuum switch, all in an easy, effective manner as compared with the prior art.

According to a first aspect of the present invention, a vacuum switch container is provided which is made of ceramics and has a cylindrical shape, wherein the container has a center line average roughness Ra of 1.0 $\mu$m or less and a ten-point average roughness Rz of 10.0 $\mu$m or less, in an axial direction at the outer circumferential surface of the vacuum switch container.

The vacuum switch container (i.e., the fired product) is intended for use as an insulating member in a vacuum switch.

In accordance with this aspect of the present invention, excellent insulation properties are achieved, because the outer circumferential surface of the container is extremely smooth and flat, thereby inhibiting foreign matter (e.g. an electroconductive substance such as carbon or the like) from adhering thereto. More particularly, it is of advantage in relation to the insulation properties that when a grazing layer is not formed on a surface of the container, i.e., the outer circumferential surface, such inhibition of the adherence of foreign matter to the surface is still highly effective.

According to a second aspect of the present invention, a vacuum switch container is provided which is made of ceramics and which has a cylindrical shape, wherein the container has a center line average roughness Ra of 1.0 $\mu$m or less and a ten-point average roughness Rz of 10.0 $\mu$m or less in axial and circumferential directions of the outer circumferential surface of the vacuum switch container (the circumferential direction being the direction along the outer circumferential surface around the axis thereof).

In accordance with this second aspect of the present invention, it is of advantage that the surface roughness is small not only in the axial direction but also in the circumferential direction of the outer circumferential surface. As a result, the insulation performance of the container is high, as in the container according to the first aspect of the invention described above.

Advantageously, a glazing layer is provided on the outer circumferential surface of the vacuum switch container. Such a glazing layer on the outer circumferential surface of the vacuum switch container makes it even more difficult for dirt to adhere thereto.

In accordance with a third aspect of the invention, a vacuum switch is provided which includes the above-described vacuum switch container as an insulating member of the switch.

The vacuum switch according to the third aspect of the present invention has excellent insulation properties which result from the use of the above-described vacuum switch container as an insulating member therein.

In accordance with a fourth aspect of the present invention, a method of producing a vacuum switch container, is provided, comprising the steps of:

producing a green compact for a vacuum switch container by subjecting ceramic granulated powders to die-molding;

firing the green compact so as to produce a fired ceramic body; and producing the vacuum switch container from the fired compact.

In accordance with the present invention, because the ceramic granulated powders are provided in a metallic die and die pressed, i.e., a green compact is formed by die-molding, a surface thereof (and in particular, the outer circumferential surface thereof is smooth and flat and the dimensional accuracy of the container is high as compared with containers produced by the conventional rubber-press method.

As a result of the foregoing, because there is no need for cutting the outer circumferential surface of the green compact to adjust the size thereof as has conventionally been done, the operational steps used in making the container can be simplified. A further advantage is that costs are reduced because, since cutting of the outer circumferential surface is not necessary, ceramics material is not wasted. Furthermore, since the outer circumferential surface is not subjected to cutting, no cutting marks are left on the outer circumferential surface, thereby further ensuring that the surface is smooth and flat.

In the method according to the fourth aspect of the invention, the green compact may be formed by:

placing the ceramic granulated powders in a cylindrical space of a metallic die formed by a center pin, an outer mold, a lower punch and an upper punch; and pressing the ceramic granulated powders within the space.

By using such a die-molding step, a green compact can be produced which has a smooth and flat surface and high dimensional accuracy.

The die-molding step preferably includes applying pressure on the ceramic powders in the space using the lower and upper punches.

In accordance with a fifth aspect of the present invention, a method of producing a vacuum switch is provided, further comprising, after producing the vacuum switch container by the above-described method, performing the steps of:

arranging a switch member in the vacuum switch container and producing the vacuum switch therefrom.

It will be appreciated that this method is of advantage from a cost standpoint, because the vacuum switch is produced by using the above-described method of producing the vacuum switch container, i.e., a simplified production process as compared with the prior art.

Further features and advantages of the present invention will be set forth in, or apparent from, the detailed description of preferred embodiments thereof which follows.

DESCRIPTION OF THE PREFERRED EMBODIMENTS

Hereinafter, embodiments (in the form of various examples) of a vacuum switch container, a vacuum switch, a method of producing the vacuum switch container and a method of producing the vacuum switch, all according to the present invention, are described with reference to the accompanying drawings.

EXAMPLE 1

In this example, a vacuum switch container is described and a method of producing a vacuum switch container is explained.

Figure 1:
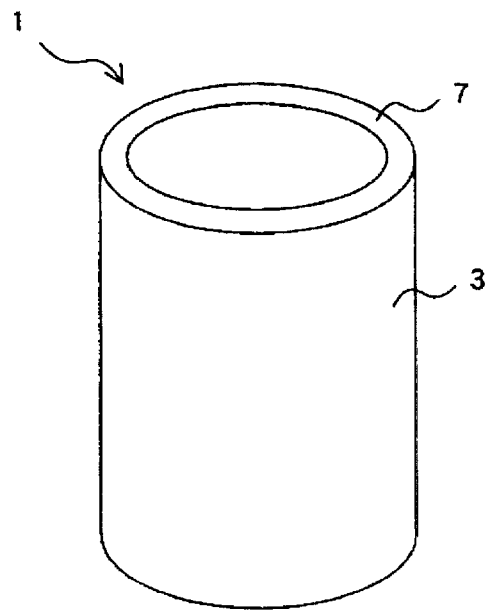
FIG. 1 is a perspective view of a vacuum switch container according to Example 1 described below.

First, with respect to the nature of composition of the vacuum switch container, as shown in FIG. 1, a vacuum switch container 1 according to the present example is used as an insulating member forming an outer cylinder of a vacuum switch. An electroconductive layer 7 comprising a metalized layer and an Ni-plated layer is provided on each of the end surfaces of a ceramic fired body 3 which is the base substance or base unit of switch container 1.

In this exemplary embodiment of this configuration, the above-described ceramic fired body 3 is a cylindrical member having an inner diameter of 90 mm, a thickness of 5 mm and a height of 100 mm, and is a hard fired product produced by firing of the same at a high temperature.

In ceramic fired body 3, the surface roughness in both the axial and circumferential directions on inner and outer circumferential surfaces thereof is extremely small. Specifically, the central line average roughness, Ra, is 1.0 μm or less and, further, the 10-point average roughness, Rz, is 10.0 μm or less in the axial and circumferential directions thereof. Thus, the ceramic fired body 3 is extremely smooth with little or no surface irregularity.

Turning now to a specific example of a method of producing the vacuum switch container 1, first, raw material powders of alumina and flux components (calcia, silica and magnesia), a binder (a binder containing, for example, an acrylic binder and a dispersant) and water were mixed in a ratio as shown in Table 1 described below and blend-ground, using a mill, to produce a slurry.

TABLE 1

| Components | % by weight |
|---|---|
| Alumina | 55.2 |
| Flux components | |
| Calcia | 0.5 |
| Silica | 2.7 |
| Magnesia | 0.5 |
| Binder | 3.4 |
| Water | 37.7 |

Next, the above-described slurry was atomized and dried to produce ceramic granulated powders.

Thereafter, the above-described ceramic granulated powders were loaded in a metallic die of a predetermined shape and pressed to provide die-molding thereof.

Figure 2:
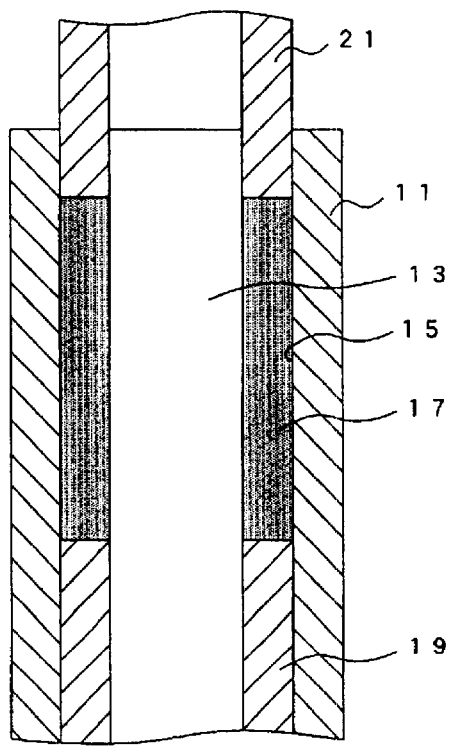
FIG. 2 is a cross sectional view of die-molding apparatus used in the production method for a vacuum switch container according to Example 1.

Specifically, as shown in FIG. 2, the above-described ceramic granulated powders indicated at 17 were used to fill a space 15 of a cylindrical shape defined by an outer mold 11 made of hard metal and having an inner diameter of 120 mm, and a center pin 13 made of hard metal having an outer diameter of 108 mm. A pressure of 1000 kg/cm$^2$ was applied in an axial direction with respect to the cylindrical shape, using a lower punch 19 and an upper punch 21, both of a similar cylindrical shape. The pressure was thus applied from both the top and bottom of the cylindrical space 15 thereby producing a green compact.

Next, the above-described green compact was fired in open air at 1600° C. to produce a ceramic fired body 3 of a cylindrical shape, as shown in, and as described above in connection with, FIG. 1.

In the next step, each of the end surfaces of the ceramic fired body 3 was ground.

Next, the ground surfaces were metalized. Specifically, Mo powders, Mn powders, SiO$_2$ powders, a binder and a solvent were mixed to produce a paste, and the paste was applied to the corresponding ground surface and fired to form a metalized surface.

As a further step, Ni plating was applied on the metalized surface, thereby forming thereon an electroconductive layer corresponding to layer 7 of FIG. 1 to complete the vacuum switch container 1.

Experimental testing which has been carried out for the purpose of confirming the improved characteristics of the container of the present example will now be considered.

Samples (identified as Nos. 1 to 3) of the ceramic fired body were produced by the production method according to the above-described examples and the surface roughnesses, Ra and Rz, in the axial and circumferential directions of the outer circumferential surface thereof were then determined.

Further, as comparative examples or benchmarks, similar samples (Nos. 4 and 5) of the ceramic fired bodies were produced by a conventional rubber-press method and the surface roughnesses, Ra and Rz, in the axial and circumferential directions of the outer circumferential surface thereof, were then determined.

Further, while the above-described samples (Nos. 1 to 5) were being used, the insulation properties thereof were tested using an experimental method which carried out, in procedural order, step (a) to step (c) described below. The results are shown in Table 2 below. The experimental testing comprised the following steps:

(a) An area of 10 mm square from each of the end portions of each sample was entirely smeared or covered using a pencil (i.e., covered with graphite).

Figure 3:
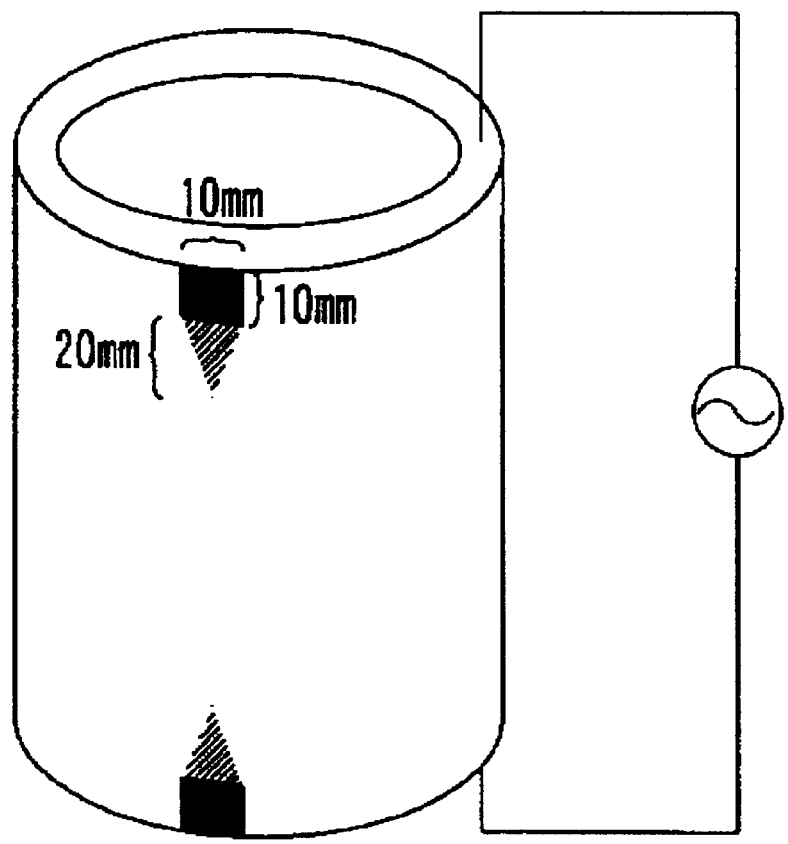
FIG. 3 is a perspective view of a container, which is discussed below, in explanation of a testing method.

(b) Next, as indicated by the triangular area in FIG. 3, the entirely smeared or covered area was extended in the axial direction by about 20 mm using the finger. Then, the attaching condition of the graphite (and thus the amount of "dirt" adhered in the triangular area) was observed.

(c) As shown in FIG. 3, in open air, a voltage (alternating voltage of 60 Hz) was applied to the electroconductive layer, comprising the metalized layer and the plated layer on each end of the sample, in a manner in which the voltage was gradually elevated to determine a break-down voltage (or short-circuit voltage).

TABLE 2

| Nos. | Ra [m] | | Rz [m] | | Test results: Break-down voltages [kv] | Eval-u-ations |
| --- | --- | --- | --- | --- | --- | --- |
| | Axial directions | Circum-ferential directions | Axial directions | Circum-ferential directions | | |
| Examples | | | | | | |
| 1 | 0.9 | 0.7 | 9.1 | 6.0 | 55 | O |
| 2 | 0.7 | 0.9 | 6.8 | 6.5 | 54 | O |
| 3 | 0.9 | 0.6 | 8.7 | 7.2 | 53 | O |
| Comparative Examples | | | | | | |
| 4 | 3.1 | 1.9 | 21.2 | 11.7 | 36 | X |
| 5 | 1.3 | 1.2 | 11.0 | 6.4 | 38 | X |

Referring to Table 2, in the column labeled "Evaluations," the notation "O" indicates that the break-down voltage in the test results is 40 kv or more, and "X" indicates that the break-down voltage in the test results is less than 40 kv.

As is apparent from Table 2, the samples of the examples within the scope of the present invention (Nos. 1 to 3) have advantageous characteristics and, in this regard the surfaces thereof are smooth, leaving no heavy dirt thereon. Thus, these samples have excellent electroinsulation properties.

In contrast, samples of examples outside the scope of the present invention do have these advantageous characteristics, since the surface of the samples are relatively rough and have relatively heavy dirt deposits thereon, and thus are inferior with respect to the surface insulation properties thereof.

As described above, in the present example, the surfaces of all of the ceramic granulated powders 17 are covered by a metallic die and pressed by the die to produce a green compact and, then, the resultant green compact is fired to produce a ceramic fired body 3 which is extremely smooth, i.e., the surface roughness of the outer circumferential surface thereof is very small.

Therefore, because cutting of the outer circumferential surface of the green compact to adjust the size thereof, as required in the conventional rubber-press method, is not necessary, the operational steps are simplified. Further, it is advantageous from a cost standpoint that, because cutting is not necessary, ceramic material is not wasted. Furthermore, since no cutting marks, as normally produced by a cutting operation, are left thereon, the smooth surface is not marred in this respect.

Since the surface of the ceramic fired body 3 in the present example is extremely smooth and flat, it is difficult for foreign matter (e.g., an electroconductive substance or the like) such as carbon generated during a production operation or the like to become attached thereto. Therefore, the insulation performance of the completed vacuum switch container 1 is excellent. In this regard, this effect is readily apparent even when a glazing layer is not provided.

Further, although, in the above example, a glazing layer was not provided on the outer circumferential surface of the ceramic fired body 3, it will be appreciated that such a glazing layer may be provided.

EXAMPLE 2

Example 2 is similar in some regards to Example 1 and further explanation of similar steps to those of Example 1 will be omitted.

The present example concerns an embodiment in which the vacuum switch container according to the above-described Example 1 is used for a vacuum switch.

The vacuum switch according to this example is a high load switch suitable for providing on/off switching of a high voltage and a large current, and suitable electrodes and like components are contained in the vacuum switch container.

Figure 4:
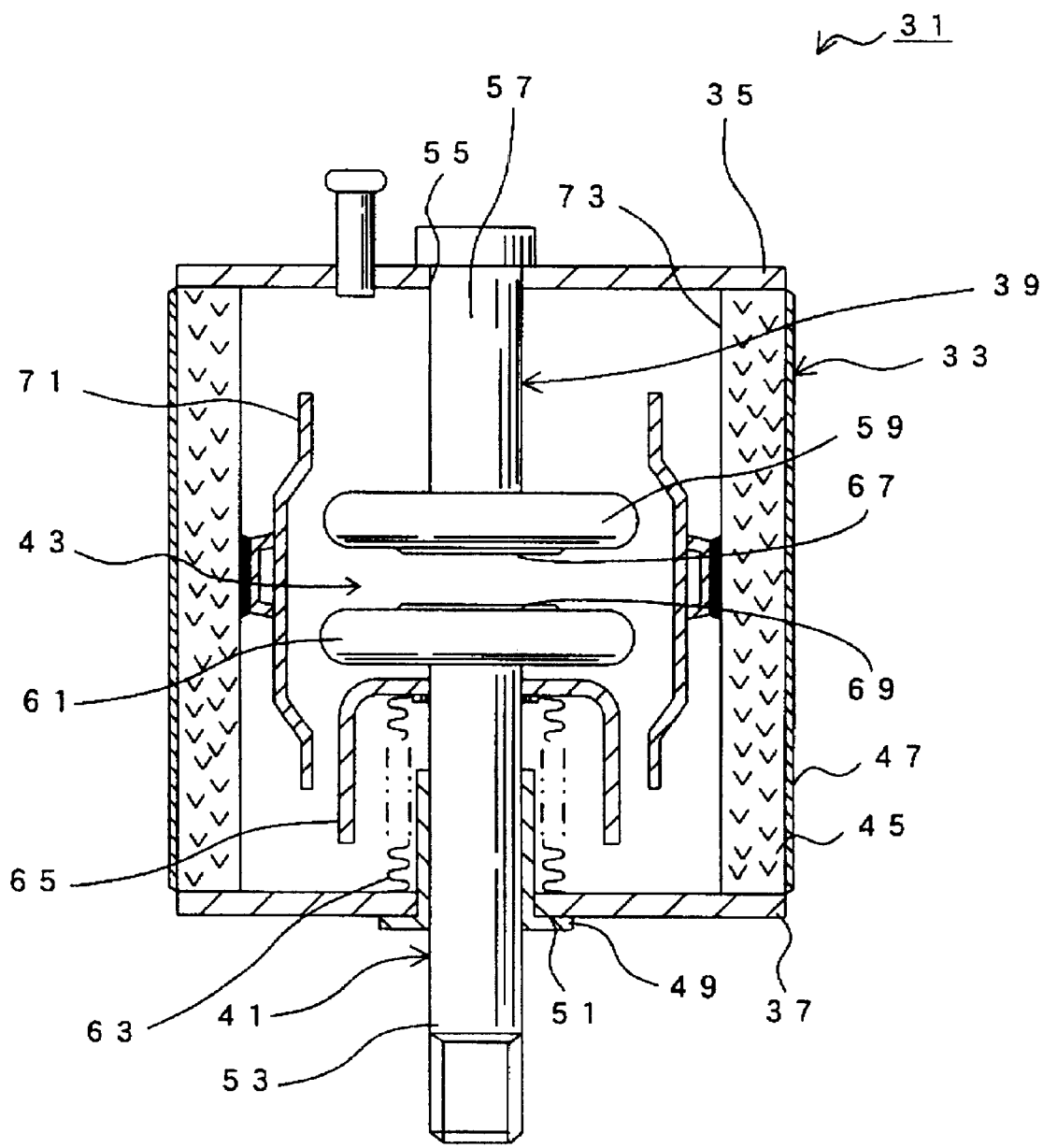
FIG. 4 is a cross sectional view showing the construction of a vacuum switch according to Example 2.
Figure 5:
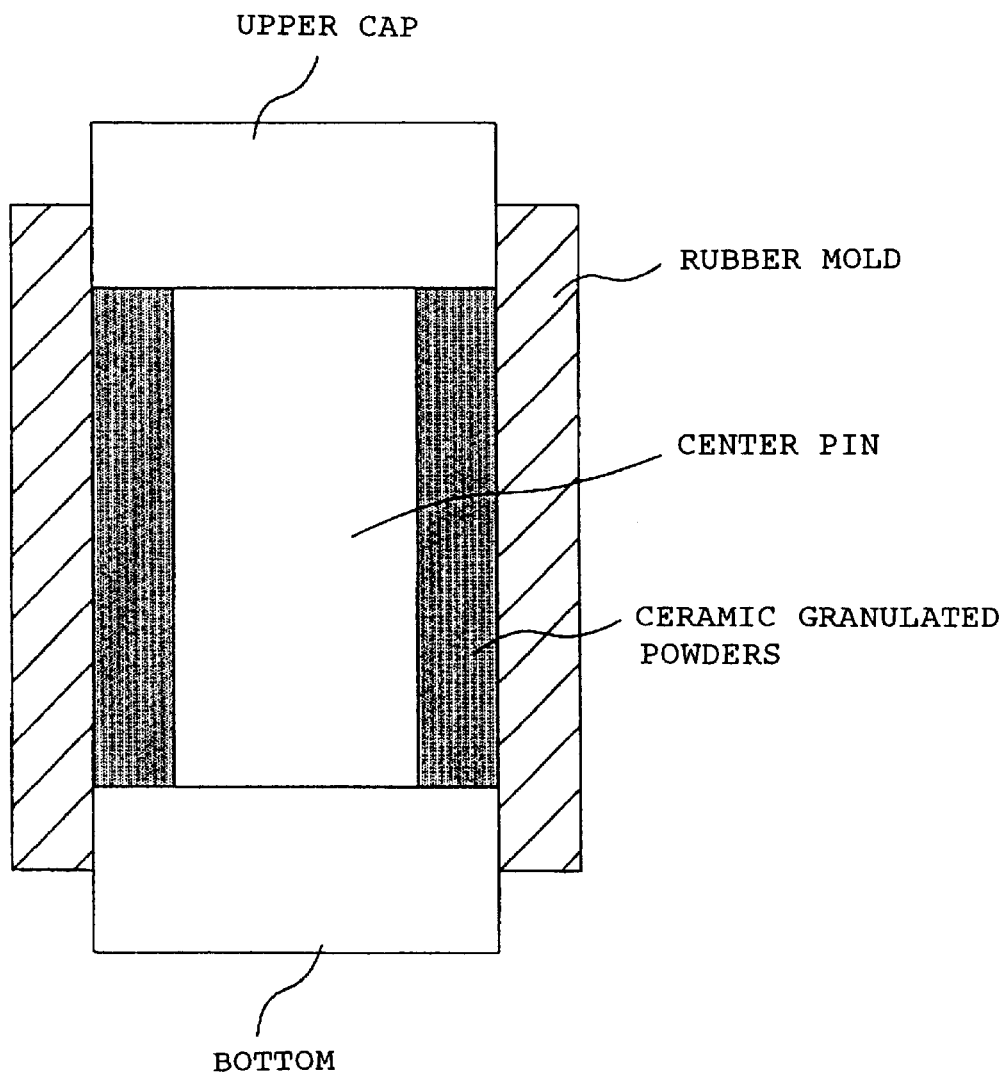
FIG. 5, which was described above, is a perspective view of apparatus used in a conventional technique for making vacuum switch containers.

Considering the latter point in more detail, as shown in FIG. 4, a vacuum switch (vacuum load switch) 31 is shown which comprises an insulation valve or member 33 that is formed by the vacuum switch container, first and second end caps 35 and 37 attached such that end portions of the insulation valve 33 are closed, a fixed electrode 39 which is attached to the first end cap 35 such that electrode 39 protrudes inside of the insulation valve 33 and a movable electrode 41 slidably provided on the second end cap 37, and a contact 43 formed by the fixed electrode 39 and the movable electrode 41.

The above-described insulation valve 33 comprises a base member formed by a ceramic fired body 45 (similar to that described in Example 1) of 92% by weight of alumina. In this example, body 45 is cylindrical in shape, has an inner diameter of 90 mm, a wall thickness of 5 mm and a length of 100 mm. Further, a glazing layer 47 is provided on the outer circumferential surface of insulation valve 33.

The above-described first and second end caps 35 and 37 are each formed by a discoid Kovar (Fe—Ni—Co) plate in a center of which a hole 51 is provided for firmly securing the fixed electrode 39 and a corresponding guide 49 thereto. Guide 49 is provided so that a movable shaft 53 of the movable electrode 41 slides easily therein.

A rear end portion of fixed electrode 39 is formed as a fixed shaft 57 which is firmly secured in hole 55 while a leading end portion thereof is formed as an annular shaped electrode 59 which projects or protrudes inside of the insulation valve 33.

A rear end portion of movable electrode 41 is formed as the movable shaft 53 which slidably moves inside of the guide 49 while a leading end thereof is formed as an electrode 61 which contacts the electrode 59 on the inner end of the fixed electrode 39. The movable electrode 41 enables an on/off switching operation in a vacuum formed in a pleated metallic bellows 63 provided between the movable shaft 53 adjacent to the electrode 61 and the second end cap 37.

The metallic bellows 63 is engaged or embraced by a bellows cover 65 to prevent any metallic vapor generated from the electrodes 59 and 61 (and, in particular, by terminals 67 and 69 at the leading ends thereof) from direct contact at the time of on/off current switching.

Contact 43 is constructed such that the respective terminals 67 and 69 of the electrodes 59 and 61 which come to contact with each other are made of a high-melting point tungsten-based sintered metal. This prevents terminals 67 and 69 from becoming welded to each other by any vacuum arc generated therebetween.

Further, an arc shield 71 is provided which surrounds the contact 43. Arc shield 71 is bonded to an inner circumferential wall 73 of the insulation valve 33 by means of brazing, so as to prevent the aforementioned metallic vapor from contacting the inner circumferential wall 73 of the insulation valve 33 and causing deterioration of the insulation properties thereof.

In this example, after the vacuum switch container (insulation valve or member 33) has been produced by the production method described above in Example 1, various of the switch members which are necessary for the vacuum switch, such as the fixed electrode 39, the movable electrode 41 and the like, are arranged inside the insulation valve 33 to complete the vacuum switch.

As described above, because the vacuum switch is produced by using a vacuum switch container according to Example 1, the present example is also advantageous costwise, since the production process therefor is similarly simplified. Further, the insulation properties of the resultant vacuum switch are excellent.

Although the invention has been described above in relation to preferred embodiments thereof, it will be understood by those skilled in the art that variations and modifications can be effected in these preferred embodiments without departing from the scope and spirit of the invention.

What is claimed is:

1. A device comprising a vacuum switch container made of ceramics and having a cylindrical shape including an outer circumferential surface, the container having a center line average roughness Ra of no greater than 1.0 $\mu$m in an axial direction at the outer circumferential surface off said vacuum switch container and a ten-point average roughness Rz of no greater than 10.0 $\mu$m in an axial direction at the outer circumferential surface of said vacuum switch container.

2. A device as set forth in claim 1, further comprising a glazing layer provided on the outer circumferential surface of said vacuum switch container.

3. A device as claimed in claim 1 comprising a vacuum switch including said vacuum switch container.

4. A device comprising a vacuum switch container made of ceramics and having a cylindrical shape including an outer circumferential surface, the container having a center line average roughness Ra of no greater than 1.0 $\mu$m in axial and circumferential directions at the outer circumferential surface of said vacuum switch container and a ten-point average roughness Rz of no greater than 10.0 $\mu$m in axial and circumferential directions at the outer circumferential surface of said vacuum switch container.

5. A device as set forth in claim 4, further comprising a glazing layer provided on the outer circumferential surface of said vacuum switch container.

6. A device as claimed in claim 4 comprising a vacuum switch including said vacuum switch container.

* * * * *